Aug. 16, 1938.   G. F. WOLFE ET AL   2,127,454
AUTOMATIC SPEED CONTROL FOR VEHICLES
Filed Sept. 8, 1936
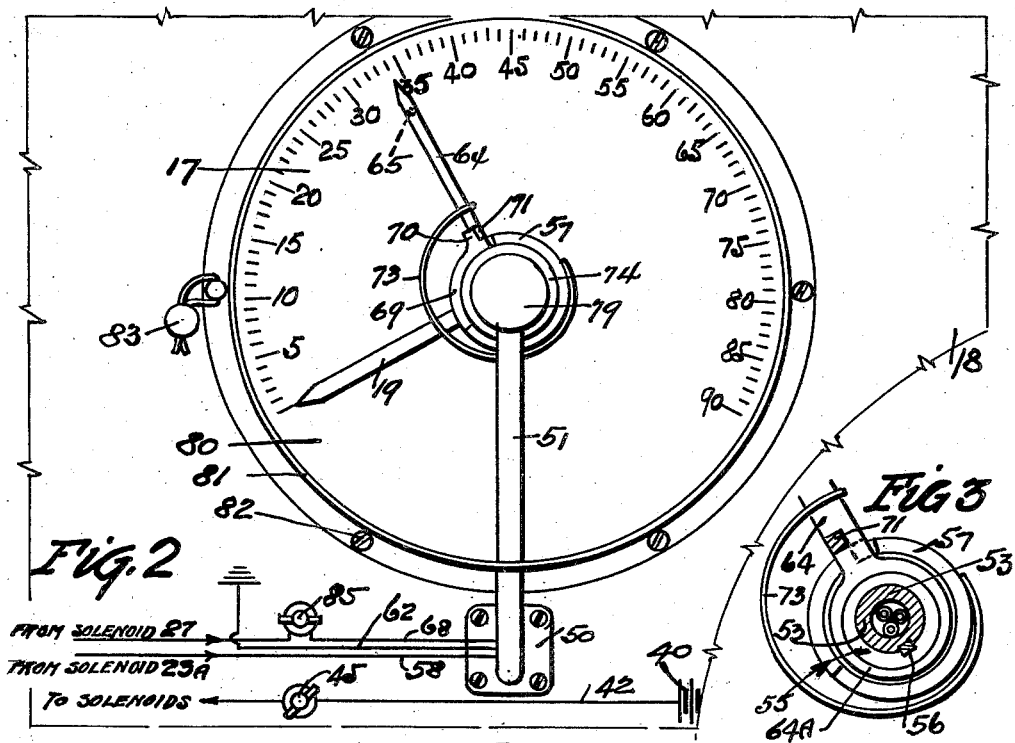
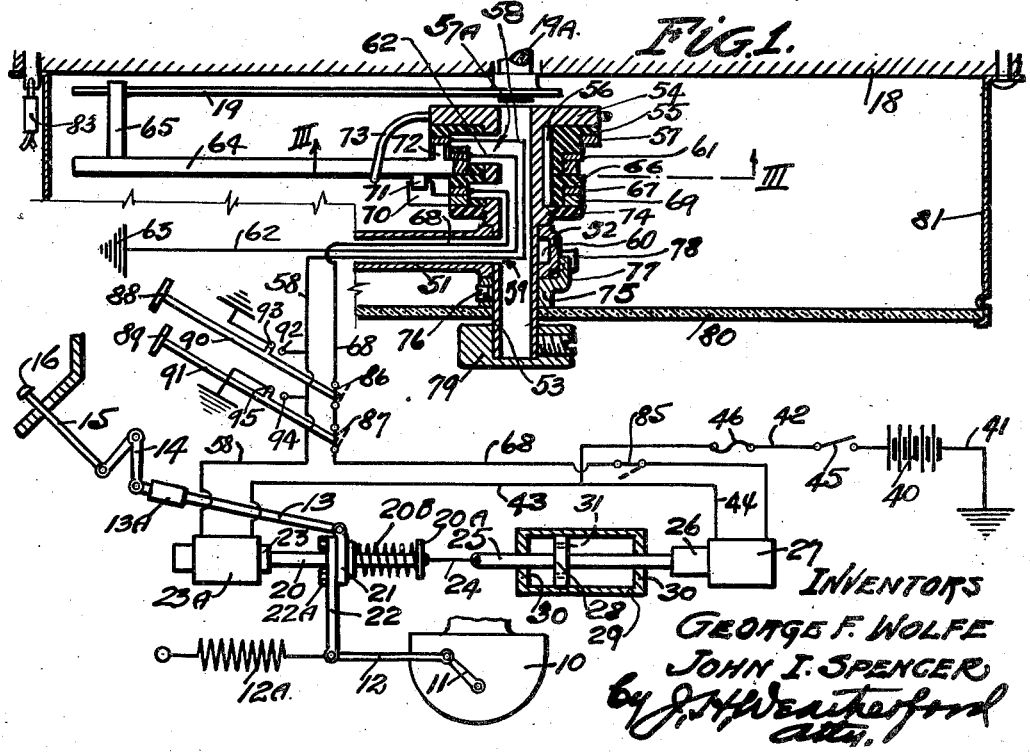
INVENTORS
GEORGE F. WOLFE
JOHN I. SPENCER Patented Aug. 16, 1938

2,127,454

UNITED STATES PATENT OFFICE 2,127,454

AUTOMATIC SPEED CONTROL FOR VEHICLES

George F. Wolfe and John I. Spencer, Memphis, Tenn.; said Spencer assignor to said Wolfe Application September 8, 1936, Serial No. 99,700

10 Claims. (Cl. 175—355)

This invention relates to a device for automatically controlling the speed of an automobile. It particularly relates to a device for use in connection with the speedometer of an automobile, in which device means is provided which may be set at a predetermined rate of speed and which device acts to regulate the flow of gas to the carburetor of the automobile to build up the speed to such predetermined rate and to thereafter maintain such rate of speed.

It further relates to a device of this kind in which governing means may be interposed solely to limit the maximum speed which may be effected.

The primary object of the invention is:

To provide in a vehicle propelled by an internal combustion engine means which may be set at any desired speed and means in connection therewith which will regulate the feed of fuel to the engine of the vehicle and build up to, and maintain the vehicle at, the speed so set.

To provide a device of this kind which may be used to govern the maximum speed of a vehicle; and Generally to improve the design and construction of such devices.

The means by which the foregoing and other objects are accomplished, and the manner of their accomplishment, will readily be understood from the following description or reference to the accompanying drawing, in which—

Fig. 1 is a diagrammatic view of the preferred form of the device as applied to an automobile having a speedometer and having an engine employing a carburetor;

Fig. 2 is an elevation of the speedometer with the materially related parts of the device mounted in proper relation thereto.

Fig. 3 is a fragmentary sectional elevation taken on the line III—III of Fig. 1.

Referring now to the drawing, in which the various parts are indicated by numerals, 10 is the carburetor of an automobile engine, no showing having been made of the engine, since the relation of such parts is usual and well known. 11 and 12 are respectively the usual control lever for the carburetor and the link ordinarily connecting such control lever through other linkage, 13, 14 and 15, to the foot feed or accelerator 16 of the automobile. 12A is a spring normally acting through the link 12 to cut off the carburetor feed. Preferably a sliding joint 13A is interposed in the link 13, so that automatic operation may be accomplished independently of the foot or other manual feed. 17 is the speedometer mounted in the usual manner on the dash 18 of the automobile, a fragmentary portion of the dash being here shown, this speedometer having the usual speed indicating numerals thereon, and a speed responsive hand 19 indicating in the usual manner the speed at which the automobile is traveling; all of the above parts being shown merely as typical of mechanisms now usually employed.

20 is a bar which is longitudinally movable and 21 a collar longitudinally movable along said bar. 20A is a collar rigidly secured adjacent one end of the bar 20 and 20B a compression spring disposed between the collar 21 and collar 20A. 22 is an arm rigidly secured to the bar 20 and movable therewith. Under certain conditions the arm may be rigidly secured also to the collar 21, as by bolts 22A, such construction being here shown, but when so secured the collar 21 becomes rigidly secured to the bar 20, and the function of the spring 20B entirely disappears. It is distinctly to be understood, however, that the bolts 22A need not be used, and where the device is operated as a maximum speed governor, are not used, and that in such cases the thrust of the accelerator 16 is transmitted through the collar 21 and the spring 20B to the bar 20, and its attached arm 22. Link 12 is pivotally connected to arm 22 and link 13 similarly connected to collar 21, these parts respectively moving with their said links. At one end the bar 20 carries the movable core 23 of a solenoid 23A. The other end of the bar is connected through a flexible link 24 and a longitudinally slidable rod 25 to the movable core 26 of a second solenoid 27. Preferably the rod 25 carries a piston 28, which is disposed in a cylinder 29 having opposed heads 30. The piston 28 preferably has perforations 31, which permit passage of a predetermined amount of liquid, the assembly when the cylinder is filled with liquid forming a double acting dash pot.

40 is a battery illustrative of a source of energy, the negative lead 41 from this battery being grounded and the positive lead 42 extending jointly through leads 43 and 44 to the solenoids 23A and 27 respectively.

45 is a control switch which preferably, as shown in Fig. 2, is mounted on the dash in accessible position, this switch being used to render the entire device operative or inoperative accordingly as it is closed or opened. 46 is a fuse.

Secured to the dash 18 is a bracket 50, from which a hollow arm 51 leads upward to the center of the speedometer, this arm terminating in a hollow hub 52, in which a hollow shaft 53 is turnably mounted, the shaft being so positioned and held by the hub as to be concentric with the shaft 19A on which the speedometer hand 19 is mounted. Integrally formed on the inner end of the shaft 53 is a flange 54. Disposed against this flange is a stepped bushing 55 of insulating material, the bushing being secured to the shaft as by a key 56.

Mounted on and secured to the largest step of this bushing is an annular metal segment 57, which extends approximately three-fourths of the distance around the bushing, as shown in Figs. 2 and 3. Both the bushing 55 and the shaft 53 are apertured, as at 57A, opposite some portion of this segment, to permit a lead 58 being secured to the segment and this lead to be brought therefrom into the bore of the shaft. The shaft 53 has an aperture opposite the hollow portion 60 of the hub 52, so that the lead 58 brought into the bore of the shaft 53, may extend along this bore to, and out through the aperture 59 into the arm 51, and thence to the solenoid 23A. It will be noted that the hub 52 preferably has an annular space 60 therein, so that the aperture 59 in the shaft opens into this hollow space no matter to what position the shaft 53 may be turned.

Mounted on the smaller step of the bushing 55, and secured thereto, is a metal ring 61, which is preferably continuous. The bushing 55 and the shaft 53 are apertured in the plane of this ring, and a lead 62 is brought from the ring into the bore of the shaft and thence, as before described, along this bore and out through the aperture 59 and the hollow arm 51 to a ground 63.

A control arm 64, having an annular hub 64A, is shiftably mounted on the bushing 55 with the hub and in contact with the ring 61, this arm carrying a pin 65 projecting into the path of the speedometer hand 19. 66 is a stepped insulating washer which holds the arm 64 in place on the first bushing and against the ring 61, this washer being likewise engaged by the key 56 and compelled to turn with the shaft 53. 67 is an annular metal contact member secured to and moving with the insulating washer 66. 68 is a lead secured to the member 67 and leading therefrom, in manner as before described, through the bore of shaft 53, and the arm 51, to the solenoid 27. Disposed against the contact member 67 is a metal washer 69, which washer has a projecting ear 70 lying in the path of a lug 71, integral with and projecting from the arm 64. Additionally the arm 64 carries an oppositely disposed lug 72 adapted in certain positions to contact with, and slide along the face of, the segment 57. 73 is a spring having one end secured to the flange 54 and the other end engaging the control arm 64. 74 is a nut confining the bushings 55 and 56 on the shaft 53 and the bushing 55 against the flange 54, and retaining the hub 64A of the arm 64, and the washer 69 on these bushings. Preferably the nut 74 is of insulating material as shown, or if not of insulating material, an insulating bushing, not shown here, is inserted between the nut and the metal washer 69.

75 is an auxiliary limiting collar disposed around the shaft 53, and secured in desired position as by a set screw 76. This collar being an adjunct which may or may not be used, and which even if used, does not affect the operation of the above described mechanism. The collar carries an integral lug 77 which projects into the path of the arm 51 or a projection 78 thereon, and may be set and clamped, so that the setting of the speed control arm 64 may not be advanced beyond a predetermined position. 79 is a knob on the outer end of the shaft 53, by which the positioning of the control arm is accomplished. All of the shaft 53 and the parts carried thereby, except the knob 79, are preferably enclosed behind a glass 80 forming the front of a housing 81, this housing rendering the auxiliary collar 75 and the remainder of the mechanism inaccessible, and may be secured to the dash 18 as by screws 82 and sealed against removal as by a seal 83.

85 is a manually controlled switch, preferably in the lead 68 to the solenoid 27, this switch normally being closed and preferably being placed on the dash 18 in an accessible position, where it is accessible when and if it be desired to render the circuit to the solenoid 27 inoperative. 86 and 87 are normally closed switches both also in the lead 68 to the solenoid 27. 88 and 89 indicate the clutch and brake pedals of the car, these pedals being respectively connected, as by links 90, 91, operatively to switches 86 and 87, either pedal being adapted to open its respective switch on operation of the usual operation of the pedal in the running of the car, and thereby rendering the solenoid 27 inoperative. 92 and 93 are a pair of contacts carried respectively by the lead 58 and link 90 of one of the pedals, and 94, 95 a similarly related pair of contacts carried by the lead 58 and the other pedal link, contacts 93 and 95 being grounded and either related pair being adapted on the operation of its pedal to ground the lead 58 and complete circuit from the battery 40 through the leads 42, 43 and the solenoid 23A, thereby completing such circuit and rendering same operative irrespective of the position of the speedometer hand 19, or of the arm 64.

Operation

In setting the device for use the casing 81, with its glass 80, is removed and the arm 64 is moved to indicate the maximum speed to which, during subsequent operation of the device, it can be turned, this movement being accomplished by turning the shaft 53. With the arm in this position the set screw 76 is loosened, if this has not already been done, and the collar 75 is turned until the lug 77 engages the projection 78 and is clamped in such position by tightening the set screw 76. The housing 81 is then replaced, secured by the screws 82 and sealed as by the seal 83 and the knob 79 is replaced and clamped by its set screw on the shaft 53. If the arm 64 was placed at say 50 miles per hour it will be possible to position it, by turning the knob 79, at any running position less than 50 miles per hour; but at no greater speed, and on the road, or otherwise, it will not be possible for the chauffeur or operator of the car to set the device for a higher rate of speed than the limit so predetermined and set.

In setting the device for running, the knob 79 is turned until the arm 64 is brought to the desired running speed; in the present instance the arm being shown at 34 miles per hour and the desired speed being between 34 and 35 miles per hour. With the switch 45 open the car may be started and operated in usual manner up to the speed fixed by the setting of the collar 75. If a greater speed than the setting of the arm 64 is reached the speedometer hand 19 will engage the pin 65 and move the arm against the resistance of the spring 73, the spring returning the arm to the set speed, as the car slows down.

When on the open road, or elsewhere, it is desired to throw the speed control into use, the switch 45 is closed, the current from the grounded battery 40 flows through the leads 42 and 44 to the solenoid 27, thence through the lead 68 to the annular member 67; thence through the washer 69, its projection ear 70 and the lug 71 on the arm 64, such lug being held in contact with the ear 70 by the spring 73; thence through the arm 64, the ring 61 and the lead 62 to the ground 63, completing the circuit and energizing the solenoid 27. Energization of the solenoid 27 attracts the core 26, and through the rod 25, the flexible link 24, the rod 20, the arm 22 and the link 12, shifts the control lever 11 of the carburetor to feed gas to the engine, this action building up the speed toward the desired speed limit. As the speed builds up the hand 19 moves until it engages the pin 65 carried by the arm 64 and thereafter moves the arm 64 with it. As the arm 64 moves the contact 71 is disengaged from the ear 70 of the washer 69, breaking the circuit to the solenoid 27, and permitting the spring 12A to act to retract the link 12, and shift the control arm 11 to cut off carburetor flow. Action of the solenoid 27 to feed gas to the carburetor, as above described, or closing action to cut off the feed when the speed limit is reached, are both delayed by the action of the plunger 28, within the dash pot 29, both actions being slowed and steadied. Ordinarily speed built up by means of the solenoid 27 is entirely too slow; if so the accelerator 16 may be depressed in usual manner and through the linkage 15, 14 and 13 the collar 21, arm 22 and link 12 the carburetor control arm may be opened as rapidly as may be desired, the flexible link 24 permitting this to be accomplished irrespective of the dash pot. When the desired speed limit is reached, and contact of the ear 70 and lug 71 broken, rendering the solenoid 27 ineffective, if the speed of the carrier continues to build up, either because of reduced car resistance, or because of the continuation of manual feed through the accelerator 16, the lug 72 of the arm 64 engages the segment 57, establishing a circuit from the battery 40 through the leads 42 and 43 to the solenoid 23A and through lead 58, segment 57, lug 72, arm 64, ring 61 and lead 62 to the ground 63, thus energizing the solenoid 23A and retracting the core 23 to withdraw the same, and through the rod 20, the arm 22 and link 12, to enclose the carburetor. This action also is resisted by the dash pot assembly, but supplementing the spring 12A is much more rapid than such action could be accomplished by the spring only.

If, at any time, the clutch pedal is depressed, the switch 86 is opened, thus rendering the feed circuit through the solenoid 27 inoperative, and at the same time the contacts 92—93 are closed, establishing the circuit through the solenoid 23A to ground and acting as in the case of the automatic cut off, to cut off flow of gas through the carburetor. The same action is also true if the brake pedal be depressed and, obviously, if both brake and clutch pedals be depressed at the same time.

If desired, the switch 85 on the lead 68 may be opened, in which case the feed actuating circuit through solenoid 27 is cut off. In such event gas is fed to the carburetor by pressure on the accelerator 16 or by the usual hand feed not shown; and the speed of the vehicle is accelerated until the speedometer hand 19, as before, picks up the arm 64 and moves the lug 72 into contact with the segment 57, establishing, as before described, a closed circuit through solenoid 23A, and tending to retract the solenoid core 23 and the control arm 11 of the carburetor connection thereto.

If sufficient pressure is exerted on the accelerator to overcome the pull of the solenoid 23A and the spring 12A, feed of gas will continue, but the extra pressure necessary is so obvious as to require a willful disregard by the operator of the speed limit. Such hook-up, however, would be advantageous in cases where a vehicle equipped with this device was over-hauling and passing another vehicle, at the time the speed limit was reached, in that it would provide means for forcing the speed beyond the set limit temporarily until the other vehicle had been passed.

If desired the screws 22A may be removed and the arm 22 be disconnected from the collar 21. In such event, the device may be operated automatically, as before described, with the switch 85 closed, the speed acceleration by the circuit through the solenoid 27 being obviously identical with that before described, as also would be the speed acceleration using the foot accelerator 16; in such event, however, when the speed limit is reached and the solenoid 23A is thrown into action to cut off fuel, depression of the accelerator 16 would merely shift the collar 12 along the rod 20, compressing the spring 20B, and, providing the pull of the solenoid 23A plus the pull of the spring 12A were greater than the action of the compressed spring 20B on the collar 20A, feed cut off would be established irrespective of the pressure on the accelerator 16. Obviously, however, in this case, it would not be possible to temporarily accelerate above the cut off speed, and the device would act also as a maximum speed governor.

Should it be desired, the switch 85 may be opened, as shown dotted in Fig. 1, and the speed build up solenoid 27 cut out. With the switch 85 so open and the bolts 22A removed the device would function solely as a speed governor as distinguished from a speed control device.

It will be distinctly understood that the various details shown are obviously largely diagrammatic and are introduced for purposes of illustration only and that we do not intend to confine ourselves to such details except where they may be in a claim specified.

What we claim is:

1. In a speed control for an automobile, or the like, having a fuel feed; means for actuating said feed, linkage connecting said means and said feed, an opposed pair of electrically responsive means, each having a movable element operatively connected to said feed, said elements being respectively responsive each to an electric current, the one to advance and the other to reduce fuel feed; a speed responsive member, an arm disposed in the path of said member, said arm having contact means thereon, a pair of contact members, one for said fuel advancing element and the other for said fuel reducing element, said arm and said contact members being manually placeable at a desired rate of speed; resilient means biasing said contact means into engagement with said fuel advancing contact member, and away from said fuel reducing contact member, said arm being movable by said speed responsive member to open said fuel feed contacts and further movable to subsequently close said fuel reducing contacts, a source of electric current, a circuit leading from said source of current through the first of said electrically responsive means, and said fuel advancing contact members, a second circuit leading from said source through the second of said electrically responsive means and said fuel reducing contact members.

2. In a speed control for an automobile, or the like, having a fuel feed; means for actuating said feed, linkage connecting said means and said feed, an opposed pair of electrically responsive means, each having a moveable element operatively connected to said feed, said elements being respectively responsive each to an electric current, the one to advance and the other to reduce fuel feed, speed responsive means, contact means advanceable thereby, a pair of contact members, one for said fuel advancing element and the other for said fuel reducing element, said contact means and said contact members being manually placeable at a desired rate of speed; resilient means biasing said contact means into engagement with the said fuel advancing contact member, and away from said fuel reducing contact member, said contact means being disposed in the path of said speed responsive means and movable thereby to open said fuel feed contacts and further movable to subsequently close said fuel reducing contacts, said contacts being spaced apart to provide an inactive period; a source of electric current, a circuit leading from said source of current through the first of said electrically responsive means, and said fuel advancing contact means and member, a second circuit leading from said source through the second of said electrically responsive means and fuel reducing contact means and members.

3. In a speed control for an automobile, or the like, having a fuel feed; an opposed pair of electrically responsive means, each having a movable element operatively connected to said feed, said elements being respectively responsive each to an electric current, the one to advance and the other to reduce fuel feed, and means for delaying the rate of action of fuel reduction, speed responsive means, contact means, a pair of contact members, one for said fuel advancing element, and the other for said fuel reducing element, said contact means and members being manually placeable at a desired rate of speed; means biasing said contact means into engagement with the said fuel advancing contact member, and away from said fuel reducing contact member, said contact means being disposed in the path of said speed responsive means and movable thereby to open said fuel advancing contacts and further movable to subsequently close said fuel reducing contacts, said contacts being spaced apart to provide an inactive period; a source of electric current, a circuit leading from said source of current through the first of said electrically responsive means, and said fuel feeding contact members, a second circuit leading from said source through the second of said electrically responsive means and said fuel reducing contact members.

4. In a speed control for an automobile, or the like, having a fuel feed, a first and a second electrically responsive means operably connected to said fuel feed, and respectively adapted to increase and decrease such feed, a speed responsive mechanism, a normally closed switch, and a normally open switch spaced therefrom in the direction of advancement of said speed responsive mechanism, said switches being respectively and successively positioned and adapted to be opened and closed by advancement of said mechanism, a first circuit including said first electrically responsive means and said closed switch, a second circuit including said second electrically responsive means and said open switch and a source of electrical energy for both said circuits.

5. In a speed control for an automobile, or the like, having a fuel feed, a first and a second electrically responsive means operably connected to said fuel feed, and respectively adapted to increase and decrease such feed, a speed responsive mechanism, a normally closed switch, and a normally open switch spaced therefrom in the direction of advancement of said speed responsive mechanism, said switches being respectively and successively positioned and adapted to be opened and closed, by advancement of said mechanism, manually adjustable means for positioning said switches at desired speeds, a first circuit including said first electrically responsive means and said closed switch, a second circuit including said second electrically responsive means and said open switch, and a source of electrical energy for both said circuits.

6. In a speed control for an automobile, or the like, having a fuel feed, a first and a second electrically responsive means operably connected to said fuel feed, and respectively adapted to increase and decrease such feed, means forming part of said connection for retarding the rates of increase and decrease of said feeds; a speed responsive mechanism, a normally closed switch, and a normally open switch spaced therefrom in the direction of advancement of said speed responsive mechanism, said switches being respectively and successively positioned and adapted to be opened and closed by advancement of said mechanism, manually adjustable means for positioning said switches at a desired speed, a first circuit including said first electrically responsive means and said closed switch, a second circuit including said second electrically responsive means and said open switch and a source of electrical energy for both said circuits.

7. In a speed control for an automobile, or the like, having a fuel feed, a first and a second electrically responsive means operably connected to said fuel feed, and respectively adapted to increase and decrease such feed responsive mechanism; a first switch, and a second switch spaced therefrom in the direction of speed advancement, said switches each including relatively fixed and movable parts, said movable parts being operably disposed in the path of advancement of said speed responsive mechanism, means biasing said first switch closed and said second switch open, a first circuit including said first electrically responsive means and said closed switch, a second circuit including said second electrically responsive means and said open switch and a source of electrical energy for both said circuits.

8. A device in accordance with claim 4, which includes in said circuits a manually operable switch for establishing and disestablishing said circuits.

9. A device in accordance with claim 4, for an automobile having a foot pedal, which includes in said first circuit an auxiliary switch normally closed and means operably connecting said foot pedal and said switch for opening said switch on operation of said foot pedal.

10. A device in accordance with claim 4, for an automobile having a foot pedal, which includes in said first circuit an auxiliary normally closed switch, and in said second circuit a normally open switch, and means operably connecting said foot pedal to said switches for respectively opening and closing them on operation of said foot pedal.

GEORGE F. WOLFE.
JOHN I. SPENCER.